US011986438B2

(12) United States Patent
Miller

(10) Patent No.: US 11,986,438 B2
(45) Date of Patent: May 21, 2024

(54) MYOFASCIAL RELEASE APPARATUS

(71) Applicant: Jeff Miller, Torrance, CA (US)

(72) Inventor: Jeff Miller, Torrance, CA (US)

( * ) Notice: Subject to any disclaimer, the term of this patent is extended or adjusted under 35 U.S.C. 154(b) by 1070 days.

(21) Appl. No.: 16/566,660

(22) Filed: Sep. 10, 2019

(65) Prior Publication Data

US 2020/0078266 A1 Mar. 12, 2020

Related U.S. Application Data

(60) Provisional application No. 62/864,353, filed on Jun. 20, 2019, provisional application No. 62/830,662, filed on Apr. 8, 2019, provisional application No. 62/828,590, filed on Apr. 3, 2019, provisional application No. 62/729,055, filed on Sep. 10, 2018.

(51) Int. Cl.
*A61H 39/04* (2006.01)
*A63B 21/06* (2006.01)

(52) U.S. Cl.
CPC ............. *A61H 39/04* (2013.01); *A63B 21/06* (2013.01); *A61H 2201/0107* (2013.01); *A61H 2201/1261* (2013.01); *A63B 2213/00* (2013.01)

(58) Field of Classification Search
CPC ............ A61H 39/04; A61H 2201/0107; A61H 2201/1261; A61H 2201/0119; A61H 2201/0153; A61H 2201/0173; A61H 2201/1253; A61H 2201/1685; A61H 2201/1695; A63B 21/06; A63B 2213/00; A63B 71/0036; A63B 2209/08; A63B 2209/10
See application file for complete search history.

(56) References Cited

U.S. PATENT DOCUMENTS 3,994,289 A * 11/1976 Thomas ................. A61H 39/04 601/120
4,520,798 A * 6/1985 Lewis .................... A61H 39/04 601/134
5,335,809 A * 8/1994 Toida .................. A47J 41/0011 220/592.27

(Continued)

OTHER PUBLICATIONS

Rogue Mobility Hand, https://www.roguefitness.com/rogue-mobility-hand, website accessed Nov. 19, 2019.

(Continued)

*Primary Examiner* — Garrett K Atkinson
(74) *Attorney, Agent, or Firm* — Workman Nydegger

(57) ABSTRACT

A myofascial release apparatus can include a head member and a shaft configured to couple to the head member and to releasably mount the head member to a weightlifting rack. This can be accomplished, for example, by threading the shaft of the apparatus through apertures on a support member of the weightlifting rack and placing a securing member or securing loop on the shaft to prevent the shaft from retreating through the support member during use. The apparatus can be included in a kit having one or more of the following additional components: a washer, a magnet, collars, two or more additional head members, or a handle. The head members can be any suitable shape, including a blunt nub head, a precision nub head, and/or a broad nub head.

14 Claims, 13 Drawing Sheets

(56) References Cited

U.S. PATENT DOCUMENTS

| | | | | | |
|---|---|---|---|---|---|
| 5,554,102 | A * | 9/1996 | Chiou | A61H 15/0092 | 601/72 |
| 5,572,757 | A * | 11/1996 | O'Sullivan | A47C 7/46 | 5/636 |
| 5,637,065 | A * | 6/1997 | Chang | A63B 23/14 | 601/72 |
| 5,848,980 | A * | 12/1998 | Demerais | A61H 23/02 | 601/135 |
| 6,015,246 | A * | 1/2000 | Yamane | B65G 51/06 | 406/189 |
| 6,652,394 | B1 * | 11/2003 | Tener | A63B 59/50 | 473/464 |
| 7,112,178 | B1 * | 9/2006 | Roozenburg | A63B 21/4033 | 601/19 |
| 7,320,668 | B1 * | 1/2008 | Warder | A61H 7/001 | 601/136 |
| 8,556,837 | B1 * | 10/2013 | Poirier | A61H 15/00 | 601/46 |
| D701,613 | S * | 3/2014 | Twiggs | D24/215 | |
| D825,770 | S * | 8/2018 | Siemer | D24/211 | |
| 10,898,408 | B2 * | 1/2021 | Merrill | A61H 7/00 | |
| 2008/0086066 | A1 * | 4/2008 | Munday | A61H 39/04 | 601/135 |
| 2008/0097262 | A1 * | 4/2008 | Adams | A61H 7/002 | 601/134 |
| 2008/0139981 | A1 * | 6/2008 | Walquist | A61H 7/001 | 601/134 |
| 2008/0200851 | A1 * | 8/2008 | Faussett | A61H 15/0092 | 601/118 |
| 2009/0057189 | A1 * | 3/2009 | Silvenis | A45D 40/222 | 206/570 |
| 2010/0036298 | A1 * | 2/2010 | Fuster | A61H 7/007 | 601/134 |
| 2010/0075816 | A1 * | 3/2010 | Anderson | A63B 21/0728 | 482/107 |
| 2011/0218465 | A1 * | 9/2011 | Yang | A61H 7/00 | 601/18 |
| 2012/0028765 | A1 * | 2/2012 | Morin | A63B 21/00047 | 482/91 |
| 2012/0150082 | A1 * | 6/2012 | Davis | A61H 15/0092 | 601/118 |
| 2013/0030464 | A1 * | 1/2013 | Taguchi | A61F 5/01 | 606/238 |
| 2013/0178768 | A1 * | 7/2013 | Dalebout | A61H 15/0092 | 601/118 |
| 2013/0261517 | A1 * | 10/2013 | Rodgers | A61H 7/005 | 601/121 |
| 2014/0336549 | A1 * | 11/2014 | Yang | A61H 7/007 | 601/112 |
| 2015/0231016 | A1 * | 8/2015 | Stearns | A61H 7/007 | 601/136 |
| 2015/0328080 | A1 * | 11/2015 | Ryan | A61H 15/00 | 601/128 |
| 2016/0317386 | A1 * | 11/2016 | Suttman | A61H 7/001 | |
| 2016/0324717 | A1 * | 11/2016 | Burton | A61H 7/001 | |
| 2017/0216136 | A1 * | 8/2017 | Gordon | A61H 23/0263 | |
| 2018/0103808 | A1 * | 4/2018 | Cheong | A47K 7/024 | |
| 2018/0142832 | A1 * | 5/2018 | Inouye | A61H 15/00 | |
| 2019/0015288 | A1 * | 1/2019 | Merrill | A61H 7/007 | |
| 2019/0017528 | A1 * | 1/2019 | Wersland | A61H 23/00 | |
| 2019/0350793 | A1 * | 11/2019 | Wersland | A61H 23/006 | |
| 2020/0038773 | A1 * | 2/2020 | Broeker | A63B 69/0053 | |
| 2020/0214930 | A1 * | 7/2020 | Wersland | A61H 23/006 | |
| 2021/0308517 | A1 * | 10/2021 | Lisi | A63B 21/0724 | |

OTHER PUBLICATIONS

Vertiball Massager, World's First Mountable Muscle Massager, https://www.vertiball.com/ accessed Oct. 2, 2019.

* cited by examiner

MYOFASCIAL RELEASE APPARATUS

BACKGROUND

Technical Field

This disclosure generally relates to wellness equipment. More specifically, the present disclosure relates to apparatuses for myofascial release and/or trigger point therapies.

Related Technology

Many people suffer from joint and/or muscle pain. In many of these cases, the location of the pain is known while the cause of the pain is unknown, leading individuals to often resort to long-term symptomatic treatment. For instance, many individuals resort to pharmaceutical analgesics and/or muscle relaxers, while others delve into alternative medicine (e.g., acupressure, acupuncture, trigger point therapy) to manage the pain or to otherwise help them to cope with the symptoms. However, such therapies are often costly and time-consuming.

Likewise, there are also many people that suffer from myofascial pain. Fascia is specialized connective tissue that provides support and protection to the body. The fascia surrounds the muscles, bones, and joints and sometimes becomes restricted due to increased stimulation (e.g., new or intense workouts), psychogenic disease, overuse, trauma, infectious agents, or inactivity. When fascia becomes restricted it can result in pain, muscle tension, and even diminished blood flow.

Massage therapy can be an effective technique for controlling/treating the source of symptomatic pain and can generally promote body health and/or wellness. Massage therapy has been known to stimulate release of endorphins and provide deep relaxation by relieving muscle tension, spasm, and stiffness—all of which are contributors to pain. Some particular massage techniques, such as the trigger point and myofascial release therapies, have been designed to alleviate trigger point and myofascial pain through cycles of isolated pressure and release.

Myofascial release is a subset of massage therapy that involves finding tightened fascia in the body and applying gentle, sustained pressure into the myofascial connective tissue to alleviate tension, pain, and discomfort and to restore motion. By applying a low load (i.e., gentle pressure) to a viscoelastic medium (i.e., the problematic fascia), the principle of viscous flow and the piezoelectric phenomenon are embodied in myofascial release therapy to elongate or “release” the fascia. For example, one common myofascial release technique includes rolling the portion of the body containing tightened/problematic fascia along an elongate cylindrical foam roller. The pressure on the fascia can break down the restrictions and promote normal soft-tissue extensibility. The therapeutic results of released fascia include a reduction in pain and discomfort, increased flexibility and function, and often an increase in performance that reduces the likelihood of injury.

Trigger point therapy is a massage technique that involves finding “trigger points” in the body and applying pressure to relieve symptoms of muscular pain and discomfort. A trigger point may also include a tight and tender spot in a muscle that refers pain (or “triggers” pain) to other areas of the body. For example, applying pressure to the paraspinal muscles for symptomatic upper and lower back pain or to the gluteus muscles for symptomatic hip pain can relieve the problematic muscle and promote relaxation while reducing symptomatic and/or referred pain.

Problematically, massage therapy—including the noted myofascial release and trigger point therapies—often require a trained professional, which can be costly to employ or inconvenient to visit, or are awkwardly implemented in devices that fail to adequately provide the desired relief or otherwise require the user to perform unnatural movements or situate themselves in compromising or undesirable positions.

A clear need exists for apparatuses, kits, and/or systems that enable on demand myofascial release and/or trigger point therapies that are intuitive, portable, and customizable.

Accordingly, there are a number of disadvantages with apparatuses for implementing myofascial release and/or trigger point therapies that can be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments of the present disclosure solve one or more of the foregoing or other problems in the art with apparatuses for implementing myofascial release and/or trigger point therapies. In particular, one or more embodiments of the present disclosure includes a myofascial release apparatus (or kit including the same) it has at least a head member and the shaft configured to couple to the head member. The myofascial release apparatus can additionally include a washer and/or a securing member, each being sized and shaped to fit around the shaft. Alternatively, the apparatus can utilize a securing loop that holds the apparatus onto the support member of a weightlifting rack via elastic tension around the support member.

The myofascial release devices of the present disclosure can be designed for quick assembly and anchoring to a weightlifting rack (or similar support member). For example, at least some embodiments of the myofascial release apparatuses disclosed herein can be anchored to a weightlifting rack by passing the shaft through apertures formed on a support member of the rack, (optionally) positioning a washer around the shaft and against the face of the support member that defines the corresponding aperture, attaching the head member to the shaft, and positioning the securing member around the shaft on an opposite side of the support member. Alternatively, the apparatus can have a shorter shaft that does not pass completely through the support member of the rack but instead penetrates a first side thereof. In this embodiment, a securing loop can be attached on opposite sides of the apparatus and around the support member of the rack to further secure the apparatus to the support member. In some implementations, the myofascial release apparatus can additionally include one or more collars that are sized and shaped to fit around the shaft and thereby more securely align the head member with the shaft and/or accommodate differently sized aperture in the support member. In some instances, the number, size, and/or type of collar used can be dependent upon the size and/or shape of the shaft or aperture. In some embodiments, the head member is configured to house the collar.

As provided herein, the head member can be selectively attached to the shaft by a magnet, which beneficially allows for quick assembly in interchangeability of the heads. Accordingly, a kit may include two or more head members, such as a blunt nub head, a precision nub head, and/or a broad nub head—each of which are suited for a particular technique/benefit—to enable a user to customize the myofascial release apparatus according to a desired treatment area and/or therapeutic benefit.

Myofascial therapy apparatuses of the present disclosure can be anchored to a weightlifting rack or other fitness equipment, as provided above, or alternatively, the myofascial therapy apparatus can be handheld. In such embodiments, the head member is connected to a handle—either directly or using any combination of components described herein. For example, the head member can be magnetically secured to the shaft, which is, in turn, connected to the handle with or without an intervening washer.

Accordingly, myofascial release apparatuses and kits incorporating one or more components of the same are disclosed.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Figure 1A:
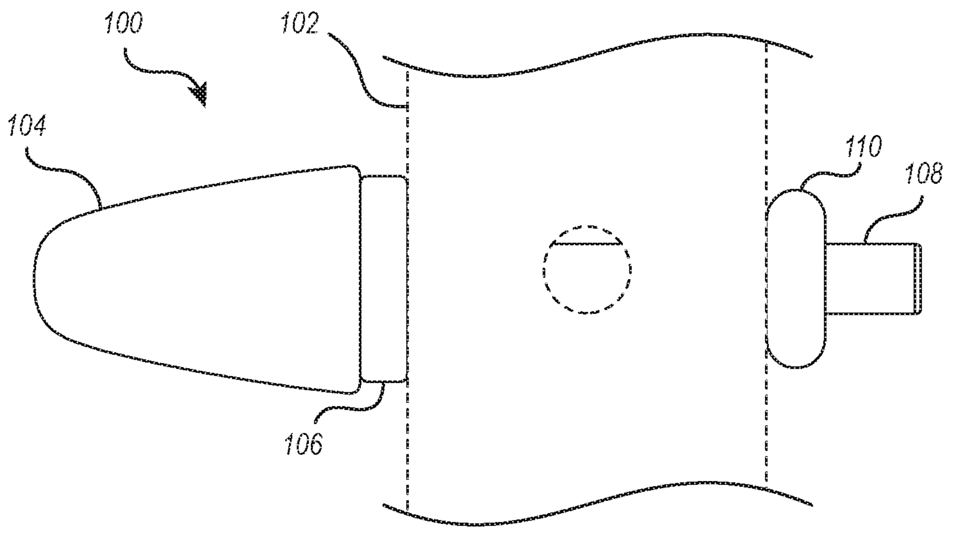
FIGS. 1A-1H illustrate various views of a mountable, blunt-nub-headed myofascial release apparatus, according to one or more embodiments of the present disclosure.
Figure 1B:
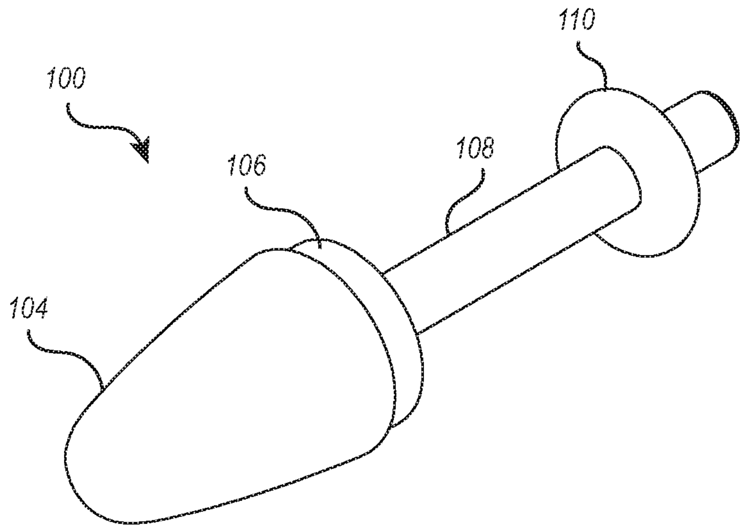
Figure 1C:
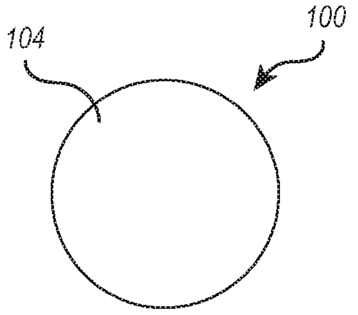
Figure 1D:
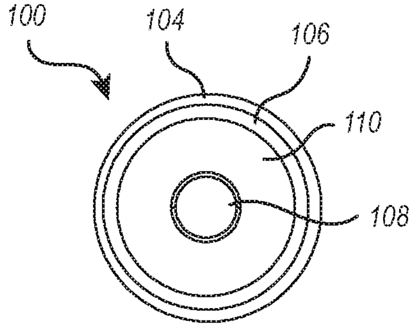
Figure 1E:
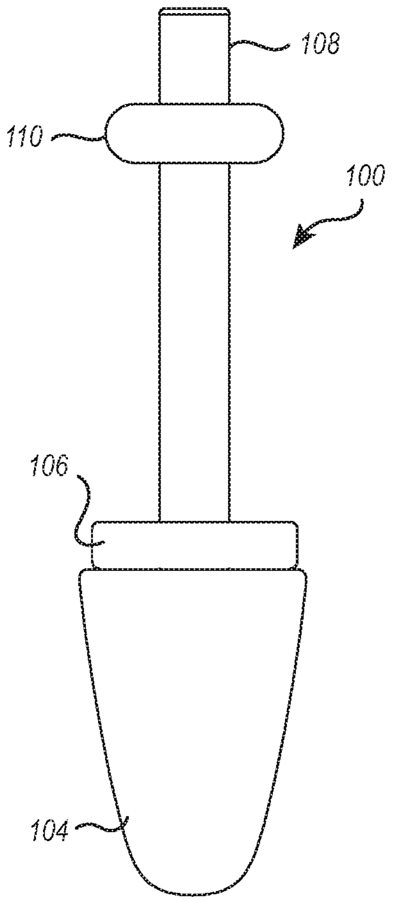
Figure 1F:
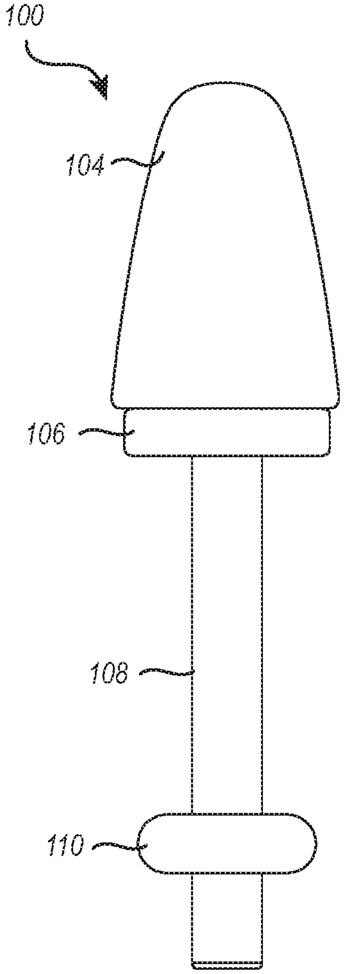
Figure 1G:
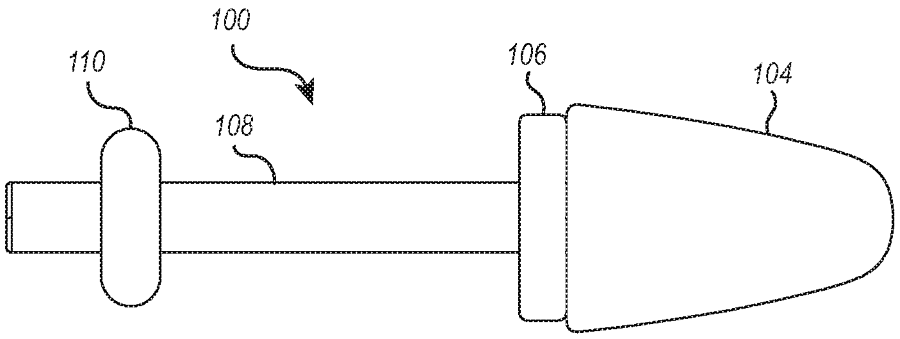
Figure 1H:
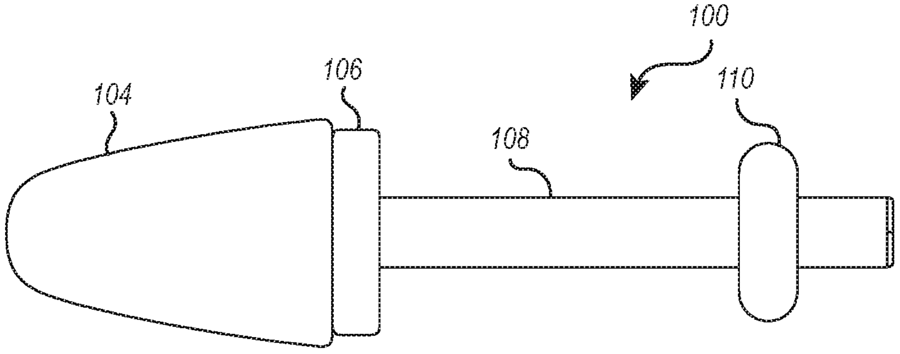

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Exemplary Myofascial Release Apparatuses

As alluded to above, embodiments of the present disclosure enable myofascial release and/or trigger point therapies to be implemented in many different locations, including, for example, at a commercial or at-home gym (e.g., when anchored to a weightlifting rack). The myofascial release apparatuses disclosed herein have a relatively small footprint, which beneficially makes these apparatuses easy to carry and transport. The disclosed apparatuses are also easily and quickly mounted to many commercial weightlifting racks, particularly those in CrossFit gyms, by simply sliding the shaft through pre-existing apertures within the weightlifting rack and securing the apparatus with the elastic securing member or elastic attachment loop. This configuration additionally enables a more secure and tight association with the weightlifting rack than other devices. Further, when mounted to the weightlifting rack, their small profile makes them convenient to use, yet unobtrusive. This combination of features allows the user to set up the device prior to or during a workout, where they can access the device at any time, without interfering with their own (or others') exercises.

The modular heads can also be quickly and easily changed, further enabling hassle-free customizability based on user preference and/or need, and when implemented, the disclosed myofascial release apparatuses provide myriad benefits. For example, myofascial release apparatuses can relieve or reduce pain, increase mobility, and be comfortably positioned so that users do not have to situate themselves in compromising, uncomfortable, or awkward positions to enjoy the therapeutic benefits of the apparatus. Additionally, the combination of components allows the apparatuses disclosed herein to fit a variety of weightlifting racks, including the most common weightlifting racks having ½-inch, ⅝-inch, ¾-inch, or 1-inch apertures formed in their support members.

Alternatively, the myofascial release devices can have heads integrally formed with associated shafts, thereby forming a solitary piece that can be attached to the framework/support of a weightlifting rack. This can provide an added benefit of simplifying the manufacture and use of the myofascial release devices and reduce the likelihood that a modular head, collar, or magnet (or other attachment member) is lost, misplaced, or damaged. In such an embodiment, the myofascial release device can be secured to the support via a securing member, as shown, for example, in FIGS. 10A-10C. The head may, in some embodiments, be constructed of a different material than the shaft.

Additionally, the shaft can include one or more annular channels or indents that can be sized and shaped to receive at least a portion of a toroidal securing member. For example, the curvature of the annular channel can be complementary to the curvature of the toroidal securing member so as to snugly receive (at least a portion of) the toroidal securing member within the channel. Multiple channels can be formed on the shaft to accommodate different widths of support members of weightlifting racks.

The components and features described herein are embodied within the exemplary myofascial release apparatuses illustrated in the accompanying figures. For example, as shown in FIG. 1A, an exemplary myofascial release apparatus 100 is illustrated where it is shown in a ready-to-use state—being anchored to a support member 102 of a weightlifting rack. As shown, the apparatus 100 includes a head member 104 that is spaced apart from a face of the support member 102 by an intervening washer 106 (which is sized and shaped to fit around the shaft 108). The shaft 108 is associated with the head member 104 via an attachment mechanism (e.g., a magnet), and extends through the washer 106, through apertures formed in the body of the support member 102 and protrudes out an opposite side of the support member 102. A securing member 110 is placed over the shaft 108 to anchor the apparatus 100 to the support member 102. In some embodiments, and as shown in FIG. 1A, the securing member 110 can be friction fit to the shaft 108 such that it abuts the face of the support member 102 that is opposite the face of the support member 102 abutted by the washer 106.

FIGS. 1B-1H illustrate various views of the myofascial release apparatus shown and described in relation to FIG. 1A. In particular, the myofascial release apparatus shown includes a blunt-nub-headed head member (as defined hereinbelow).

Although the securing member 110 of FIGS. 1A-1H is illustrated as a toroidal member, those skilled in the art will recognize that other securing members taking on various shapes and forms are within the scope of this disclosure. For example, in some embodiments, the securing member is implemented as a threaded member that screws into corresponding threads of the shaft. In other embodiments, the securing member is implemented as a magnetic member that removably attaches to a magnetic portion of the shaft of the support member of the weightlifting rack. In yet other embodiments, the securing member is embodied as a clamping mechanism, and/or a tying mechanism. In still other embodiments, the shaft itself operates as the securing member by including an element at its end (i.e., the end that extends through the support members of the weightlifting rack when the myofascial release apparatus is mounted to the weightlifting rack) that bends, opens, or otherwise changes shape (e.g., from an "open" position to a "locked" position) in order to hold the myofascial release apparatus in place with respect to the support member.

Figure 2:
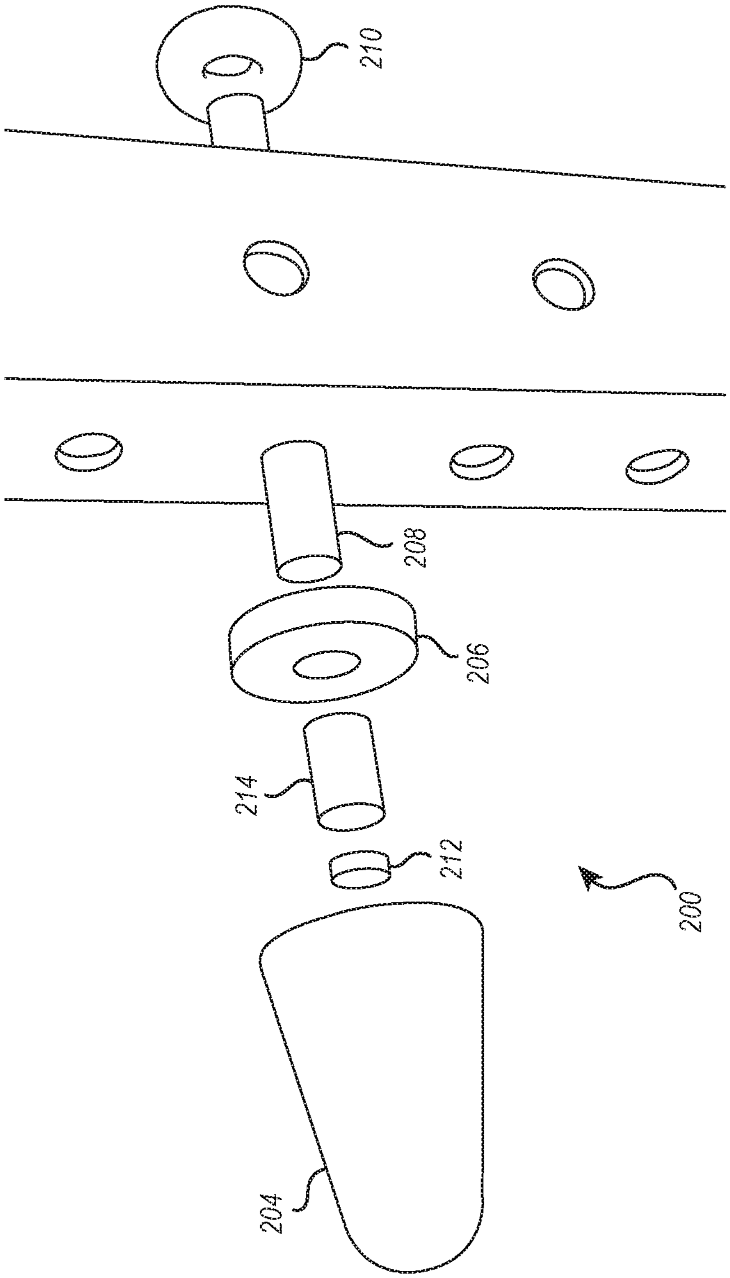
FIG. 2 illustrates an exploded view of the blunt-nub-headed myofascial release device.

FIG. 2 illustrates an exploded view of the blunt-nub-headed myofascial release device 200. The myofascial release device 200 includes (similar to the device shown in FIGS. 1A-1H) a blunt-nub-headed head member 204, a washer 206, a shaft 208, and a securing member 210. The myofascial release device 200 of FIG. 2 is shown in proximity to (e.g., with the shaft extending through) a support member 202 of a weightlifting rack. The myofascial release device 200 further includes a magnet 212 and a shim 214. Shim 214 can be used, in some implementations to facilitate alignment between magnet 212 and shaft 208 when the shaft 208 becomes removably secured to head member 204, as described in more detail hereinbelow.

In some embodiments, magnet 212 is used to facilitate a removably secure connection between the shaft 208 and the head member 204. For example, the head member 204 may include a magnetic or magnetizable element that corresponds to the magnet 212 such that magnet 212 is selectively removable from head member 204. Furthermore, shaft 208, includes a magnetic or magnetizable element that corresponds to magnet 212 such that magnet 212 is selectively removable from shaft 208. Alternatively, magnet 212 is affixed to or integrally formed with either head member 204 or shaft 208 (and is therefore only removably attachable to the other of either the head member 204 or the shaft 208).

As noted above with respect to the securing member shown in FIGS. 1A-1H, those skilled in the art will recognize that other attachment mechanisms (described hereinbelow) for removably securing the head member 204 to the shaft 208 are within the scope of this disclosure.

Figure 3:
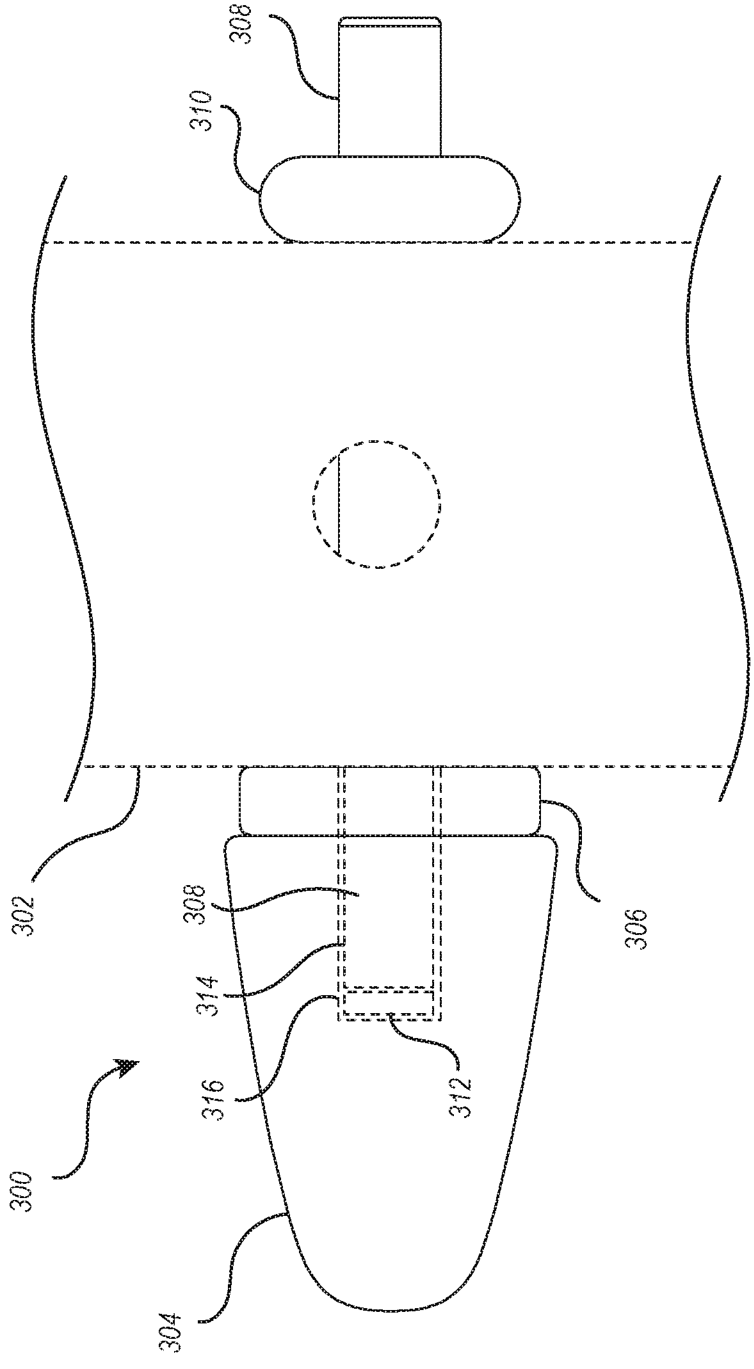
FIG. 3 illustrates a blunt-nub-headed myofascial release device mounted to a support member of a weightlifting rack (the remainder of the weightlifting rack being cropped for ease of illustration), according to one or more embodiments of the present disclosure.

FIG. 3 illustrates a blunt-nub-headed myofascial release device 300 mounted to a support member 302 of a weightlifting rack (the remainder of the weightlifting rack being cropped for ease of illustration), with the shaft 308 passing through apertures of the support member 302. As is shown, the head member 304 includes an opening 316 which is sized and shaped for receiving magnet 312, shaft 308, and/or shim 314. As such, when the myofascial release device 300 is mounted to the support member 302, as shown, lateral movement of the head member 304 with respect to the support member 302 and/or the shaft 308 is prevented by the insertion of the shaft within the opening 316 of the head member 304. Shaft 308 is therefore, in the embodiment shown, removably connected to the head member 304. Washer 306 is also shown as being positioned between head member 304 and support member 302. In some embodiments, washer 306 can prevent damage to head member 304

(e.g., where the apertures of the support member 302 are jagged and/or would cause damage to head member 304) and aid to facilitate a stable connection between head member 304 and support member 302.

As is further shown in FIG. 3, securing member 310, which is sized to fit around and releasably secure to shaft 308, is positioned over shaft 308 via a friction fit on a side of the support member that is opposite the head member 304.

Figure 4:
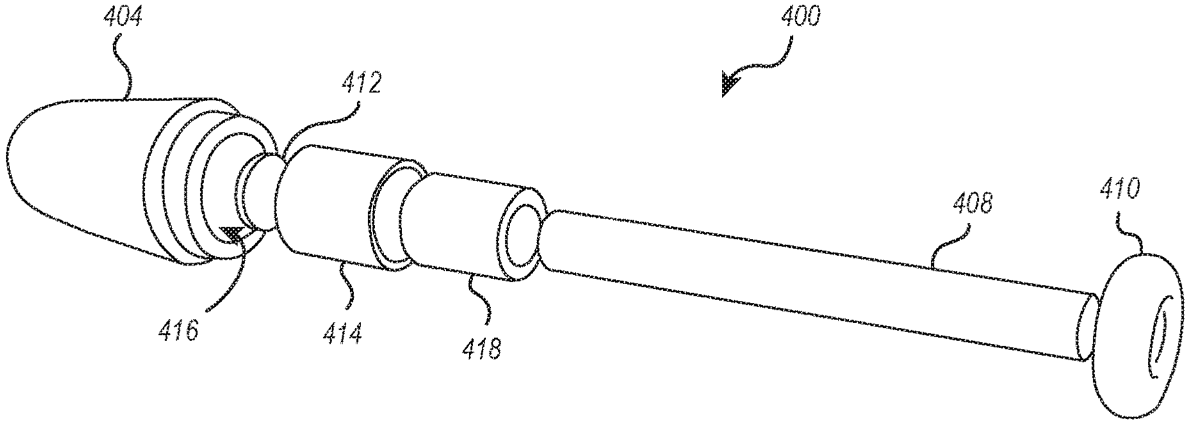
FIG. 4 illustrates an exploded view of a myofascial release apparatus outfitted with a small diameter shaft according to one or more embodiments of the present disclosure.

FIG. 4 illustrates an exploded view of a myofascial release apparatus 400 outfitted with a small-diameter shaft 408. It should be noted that apertures in support members of weightlifting racks are not identical in size. However, it is known by those skilled in the art that conventional diameters for elements fitting within such apertures are ½-inch, ¾-inch, ⅝-inch, or 1-inch. Accordingly, in some embodiments (such as the embodiment shown in FIG. 4), the myofascial release apparatus 400 includes an opening 416 which is larger than the opening 316 shown with reference to FIG. 3.

Figure 5:
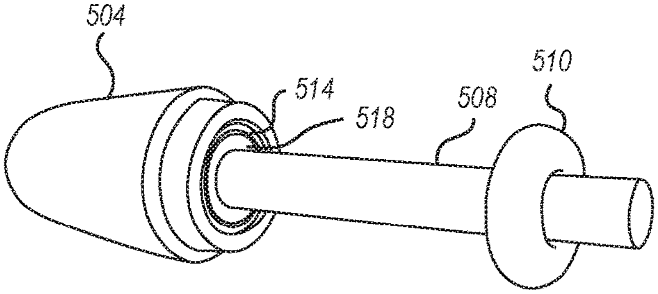
FIG. 5 illustrates the myofascial release apparatus of FIG. 4 in an assembled form according to one or more embodiments of the present disclosure.

For example, opening 416 exceeds 1 inch in diameter to receive securing collar 414 (which is also greater than 1 inch in its outer diameter). The inner diameter of the securing collar 414 is approximately 1 inch, and securing collar 414 is shaped to receive reduction collar 418 (which has an outer diameter of approximately 1 inch). Reduction collar 418 includes an inner diameter which is approximately ⅝ inch to receive shaft 408, which has a diameter of approximately ⅝ inch (securing member 410 is sized to friction fit around shaft 408). In the embodiment shown, both the reduction collar 418 and the shaft 408 removably attach to magnet 412 (which is larger in diameter than magnet 312 as shown in FIG. 3). FIG. 5 illustrates the myofascial release apparatus 500 in an assembled form, with the securing collar 514, the reduction collar 518, and the shaft 508 situated within head member 504, along with securing member 510 fit over shaft 508.

Figure 6:
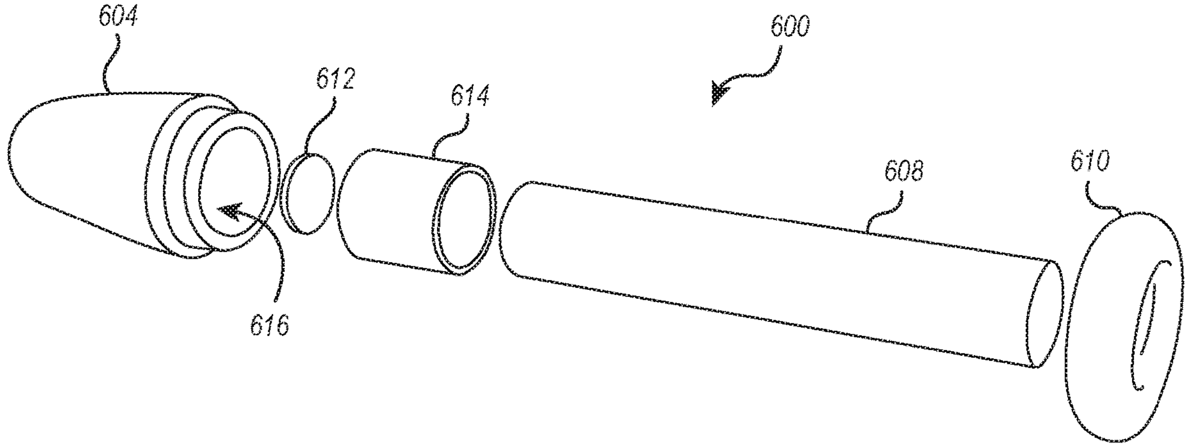
FIG. 6 illustrates an exploded view of a myofascial release apparatus outfitted with a large diameter shaft according to one or more embodiments of the present disclosure.

By implementing a large opening 416 in the head member 404 and utilizing a reduction collar 418, a myofascial release apparatus may be configurable to affix to support members of weightlifting racks with different sizes of apertures. For example, FIG. 6 shows an exploded view of a myofascial release apparatus 600 outfitted with a large diameter shaft 608. Rather than utilizing a reduction collar (similar to reduction collar 418, 518), opening 616 of head member 604 receives only magnet 612, securing collar 614, and steel shaft 608 (steel shaft 608 having an approximate diameter of 1 inch and securing member 610 being sized to friction fit to steel shaft 608). In this regard, reduction collar 418, 518 allows a myofascial release apparatus to affix to support members with apertures that are sized to receive ⅝-inch elements, and support members with apertures that are sized to receive 1-inch elements.

Figure 7:
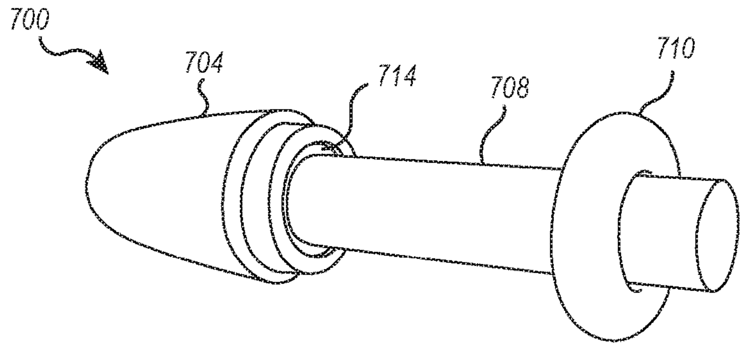
FIG. 7 illustrates the myofascial release apparatus of FIG. 6 in an assembled form according to one or more embodiments of the present disclosure.
Figure 8A:
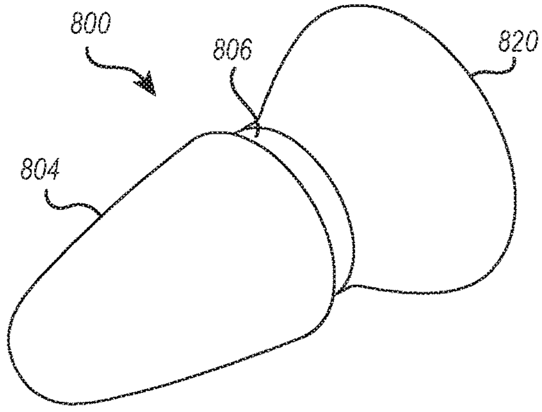
FIGS. 8A-8G illustrate various views of a handheld, blunt-nub-headed myofascial release apparatus, according to one or more embodiments of the present disclosure.
Figure 8B:
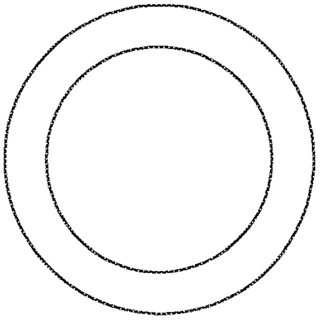
Figure 8C:
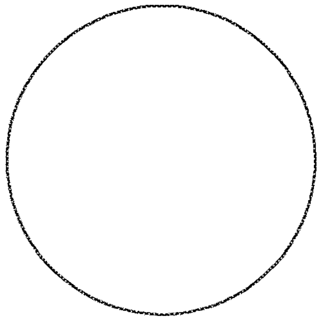
Figure 8D:
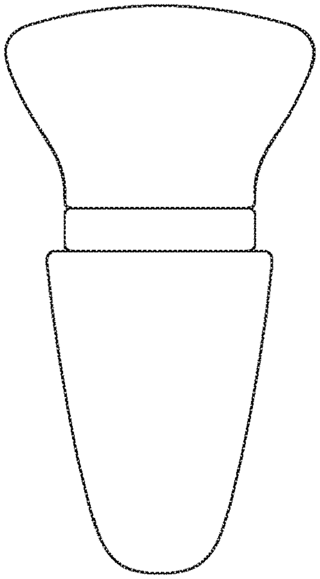
Figure 8E:
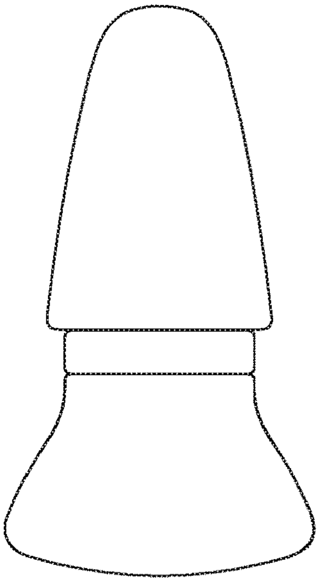
Figure 8F:
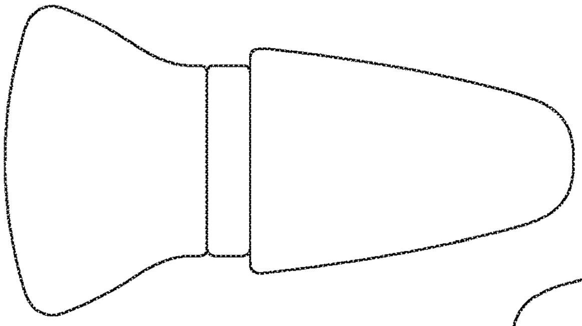
Figure 8G:
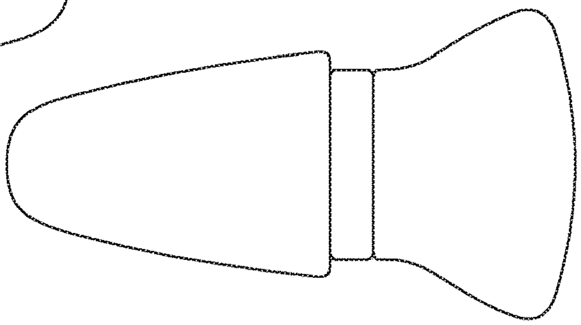

FIG. 7 illustrates the myofascial release apparatus 700 in an assembled form, with the securing collar 714 and the shaft 708 situated within head member 704, along with securing member 710 fit over shaft 708.

Those skilled in the art will understand that the size reduction principles described hereinabove with reference to FIGS. 4-7 are applicable to allow a myofascial release apparatus to affix to a support member with apertures of any sizes, and not only for the sizes explicitly described hereinabove. For example, a myofascial release apparatus includes, in various embodiments, size reduction elements to secure a shaft with a diameter of ½ inch and/or ¾ inch, and thereby affix to a support member of a weightlifting rack with apertures for receiving ½-inch and/or ¾-inch attachments.

In some embodiments, at least some of the above-referenced elements of a myofascial release apparatus (e.g., a head member, a magnet, a shim, a washer, a shaft, a securing member, a reduction collar, a securing collar, etc.) are provided to users in the form of a kit for portability and versatile application of the myofascial release apparatus/device to various types of weightlifting racks. In still other embodiments, a myofascial release apparatus kit includes a handle to allow for manual manipulation and/or use of the head member of the myofascial release apparatus, without affixation to a weightlifting rack (e.g., to utilize the head member as a massage tool for myofascial release).

For example, FIGS. 8A-8G illustrate various views of a handheld, blunt-nub-headed myofascial release apparatus 800. As shown, the handheld myofascial release apparatus 800 includes a head member 804 (which may also include a hole for receiving elements for attaching the head member to a weightlifting rack, as described hereinabove), a washer 806, and a handle 820. In some implementations, handle 820 attaches to head member 804 and/or washer 806 in a manner similar to that of the shafts described hereinabove (e.g., utilizing a magnetic attachment, with a member protruding into an opening of the head member, fitting within a shim and/or collar, etc.). In some embodiments, the washer is integrally formed as part of handle 820. In other embodiments, a distinct 806 washer is utilized. In some instances, this functionality of including a handle for manual manipulation of the head member for myofascial release adds to the versatility of a myofascial release apparatus of the present disclosure.

Figure 9:
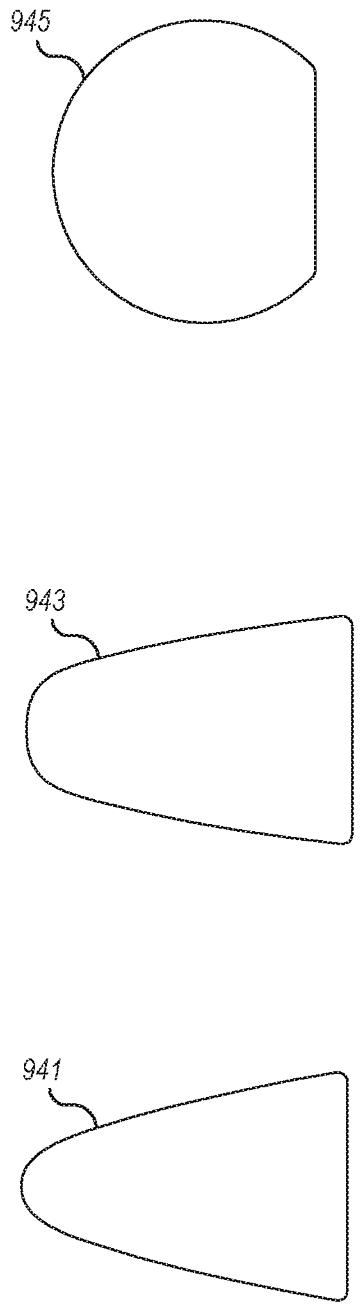
FIG. 9 illustrates various types of head members according to one or more embodiments of the present disclosure.

FIG. 9 illustrates various types of head members according to one or more embodiments of the present disclosure. Although FIGS. 1A-8G have been described with reference to a blunt-nub-head head member, it should be noted that this particular form factor of the head member is non-limiting. For example, a head member could be implemented as a precision nub head, a blunt nub head, and/or broad nub head (the particularities of the form factors of these various head members being described in more detail hereinbelow). In some instances, a myofascial release apparatus/device kit includes two or more different types of nub heads in order to allow for versatility in the applications of the device. In one example, a user experiencing acute pain in a focused location might utilize a precision nub head, and the same user might utilize a broad nub head to treat general, unfocused pain on another occasion.

Figure 10A:
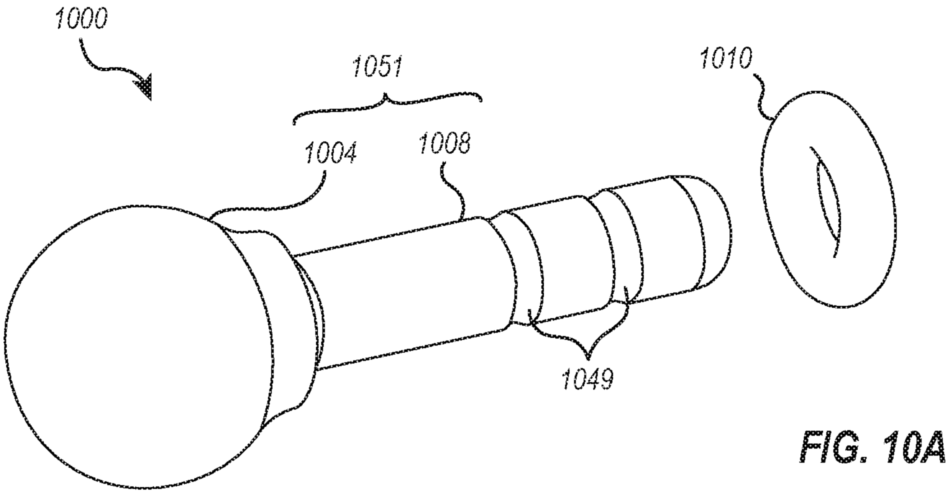
FIGS. 10A-10C illustrate various views of a broad-nub-headed myofascial release device having a two-piece manufacture—a head member integrally connected to a shaft and (ii) a securing member—according to one or more embodiments of the present disclosure.
Figure 10B:
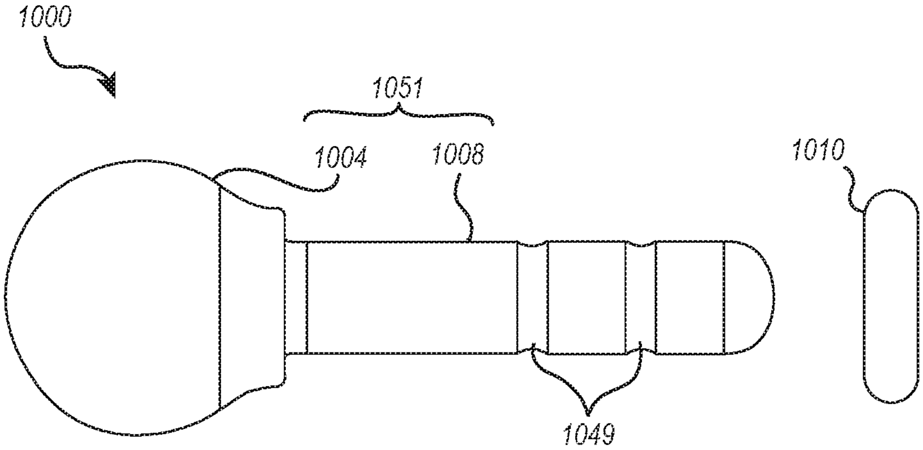
Figure 10C:
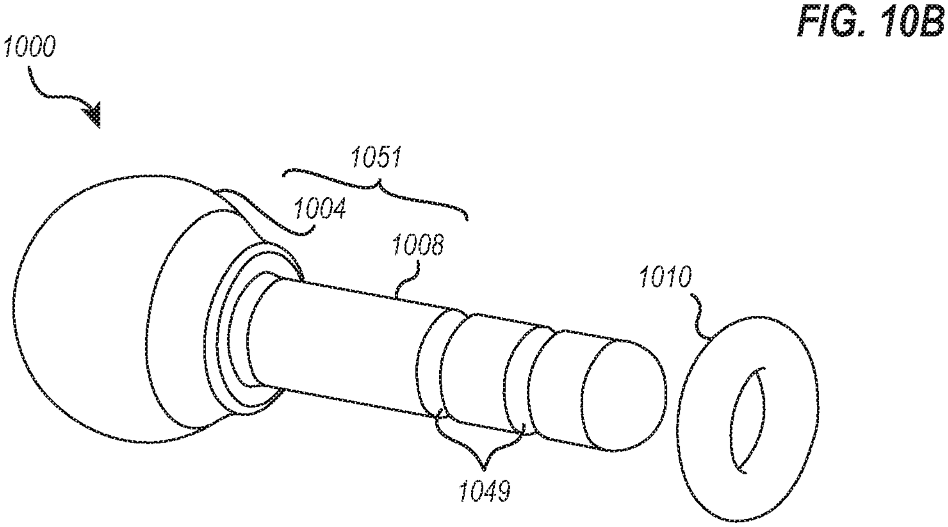

It will be appreciated that while the foregoing embodiments have been described as having a head member that can be selectively connected and/or disconnected from a shaft, this configuration is illustrative only, and non-limiting. For example, FIGS. 10A-10C illustrate various views of a broad-nub-headed myofascial release device 1000 having a two-piece manufacture: a combined head member 1051 that includes a head member 1004 that is integrally formed with, or integrally connected with, a shaft 1008, and a securing member 1010 sized and shaped to releasably secure to the shaft 1008. As is shown, shaft 1008 of combined head member 1051 includes one or more channels 1049 for receiving and holding secure the securing member 1010 when the myofascial release device 1000 is affixed to a support member of a weightlifting rack. Having a plurality of channels 1049 may allow, in some instances, for the myofascial release apparatus 1000 to attach to weightlifting racks with support members of differing thicknesses.

Figure 11A:
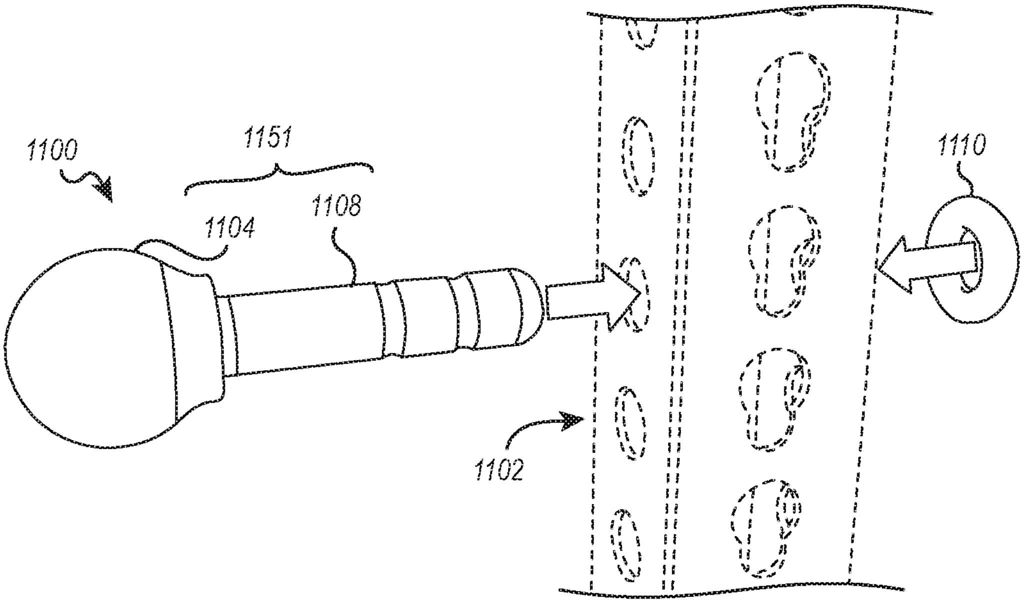
FIGS. 11A-11B illustrate various views of the broad-nub-headed myofascial release apparatus of FIGS. 10A-10C becoming mounted to a support member of a weightlifting rack (the remainder of the weightlifting rack being cropped for ease of illustration), according to one or more embodiments of the present disclosure.
Figure 11B:
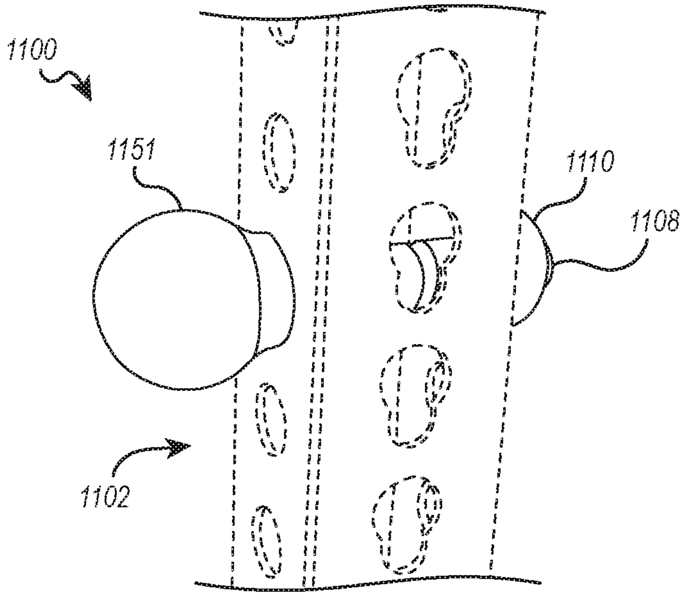

FIGS. 11A-11B illustrate various views of the broad-nub-headed myofascial release apparatus 1100 (e.g., similar to the device described with reference to FIGS. 10A-10C)

becoming anchored to a support member 1102 of a weightlifting rack (the remainder of the weightlifting rack being cropped for ease of illustration). FIG. 11A shows that to mount the myofascial release apparatus 1100 to a support member 1102, the combined head member 1151 (including head member 1104 and shaft 1108) is inserted into an aperture of the support member 1102, and the securing member is secured over the shaft after at least a portion of the shaft extends through an opposing side of the support member 1102. FIG. 11B illustrates the myofascial release apparatus 1100 after it has been successfully mounted to the support member 1102 of a weightlifting rack.

Those skilled in the art will recognize that providing a myofascial release device that comprises only two parts (e.g., the combined head member 1051 and the securing member 1010) may, in some instances, provide users with a more simple and intuitive device, and can also allow a simplified manufacturing process (e.g., wherein the combined head member is manufactured as a single part, rather than having separate manufacturing processes for a separate head member and shaft).

It should further be noted that alternative 2-piece configurations are within the scope of this disclosure. For example, a 2-piece configuration of a myofascial release device may include, in some implementations, (1) a combined shaft member which includes a shaft that is integrally formed with, or integrally connected with, a securing member, and (2) a head member, to which the shaft of the combined shaft member is configured to thread into, become selectively magnetically attached to, or otherwise removably connect (e.g., by any other attachment mechanism).

Figure 12:
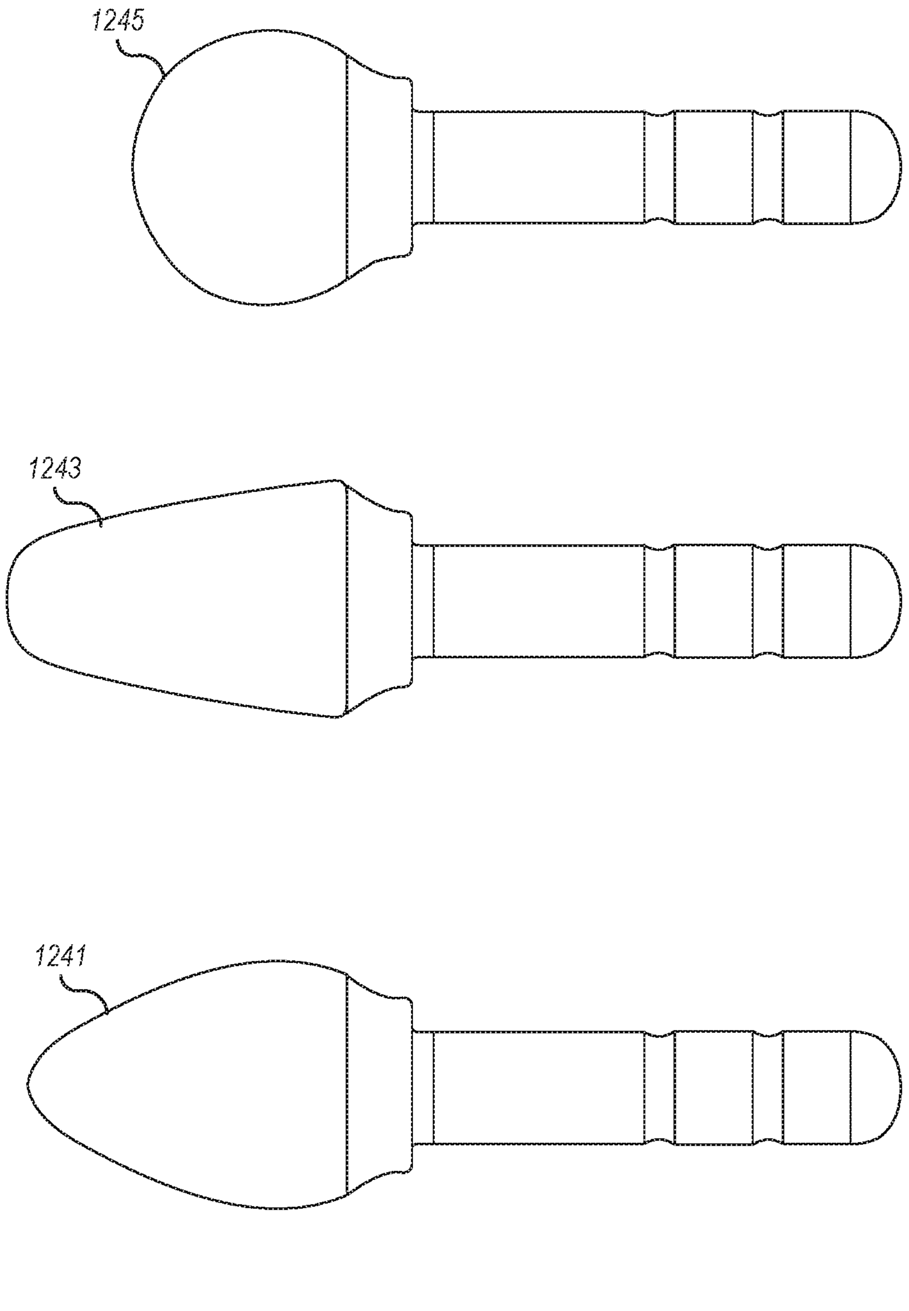
FIG. 12 illustrates various types of combined head members integrally formed with shafts, according to one or more embodiments of the present disclosure.

Similar to FIG. 9, as described hereinabove, FIG. 12 illustrates various types of combined head members including head members that are integrally formed with shafts. As shown, a head member of a combined head member may include a precision nub combined head member 1241, a blunt nub combined head member 1243, and/or a broad nub combined head member 1245.

Figure 13:
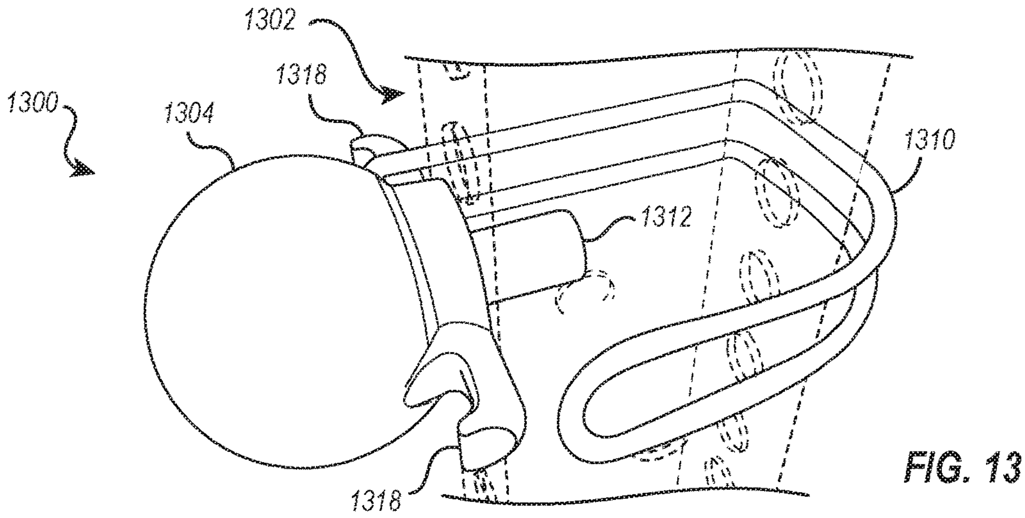
FIG. 13 illustrates an alternative embodiment of a mountable, broad-nub-headed myofascial release device having an attachment loop (shown in a partially secured state) that can be used to secure the myofascial release device to a support member of a weightlifting rack, according to one or more embodiments of the present disclosure.

In another embodiment (e.g., as shown in FIG. 13), the myofascial release apparatus 1300 includes a head member 1304 and shaft 1312. The shaft 1312 extends through an aperture formed on one face of the support member 1302, and an elastic attachment/securing loop 1310 further secures the apparatus 1300 to the support member 1302 by, for example, attaching to a first arm of a pair of opposing arms 1318 of the apparatus 1300, wrapping around the circumference of the support member 1302, and attaching to a second opposing arm of the pair of opposing arms 1318 of the apparatus 1300. This configuration can, in some instances provide additional benefits. For example, because the shaft does not extend all the way through the support member, there is a lower risk for accidental injury or obstruction from the exposed shaft. Additionally, in some instances, because the head member 1304 myofascial release apparatus 1300 has a smaller shaft (as compared with at least some other shaft members herein disclosed), and because of the flexible nature of the securing loop 1310, a more compactable myofascial release device is provided. These configurations, as well as other configurations herein disclosed, may prevent unwanted or unintentional movement of the myofascial release apparatus relative to the support member of a weightlifting rack.

Figure 14A:
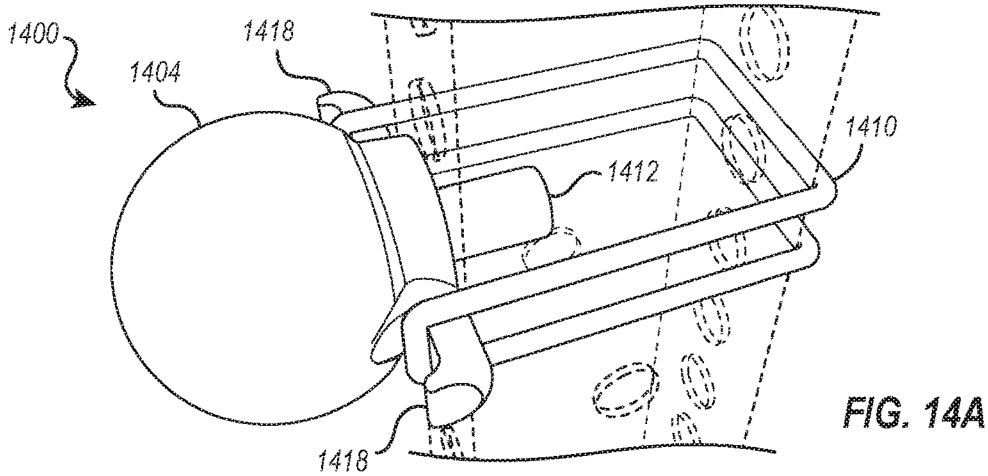
FIGS. 14A and 14B illustrate the mountable, broad-nub-headed myofascial release apparatus of FIG. 13 with the attachment loop in a fully secured state.
Figure 14B:
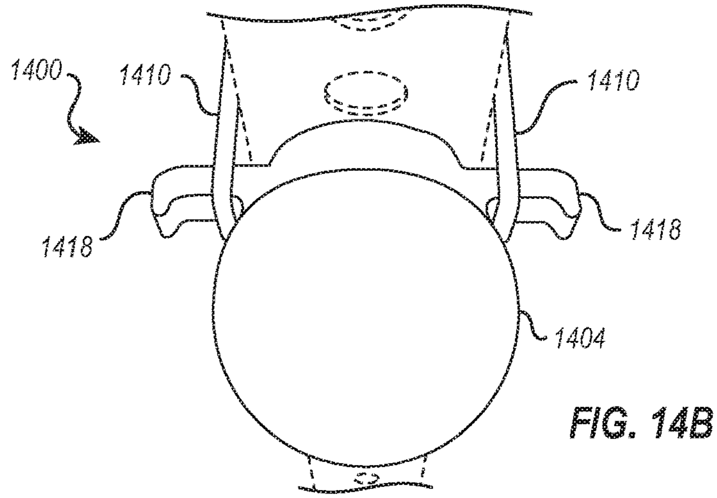

FIGS. 14A and 14B illustrate a mountable, broad-nub-headed myofascial release apparatus 1400 comprising a head member 1404, a shaft 1412 (which can be integrally formed with the head member, or selectively attachable to the head member), a pair of opposing arms 1418, and a securing loop 1410 becoming attached to a support member of a weightlifting rack by inserting the shaft 1412 into an aperture of the support member and by attaching the securing loop 1410 to each of the pair of opposing arms 1418 and around a perimeter of the support member of the weightlifting rack.

It should be noted that the securing member or the securing loop, as described herein, can be made of or include any suitable material. In some instances, the securing member is made of or includes a material capable of undergoing an elastic deformation to expand an inner diameter of the securing member around a larger-diameter shaft. Similarly, the securing loop can be made from a material capable of an elastic deformation such that the length of the loop is slightly smaller than the circumference of the support member. The tendency of the elastically deformed material to return to its non-deformed state can apply a retention force about the shaft, thereby securely anchoring the apparatus to the support. The material(s) selected for the securing member or the securing loop, are preferably selected from those materials that alone, or in combination, result in a relatively low Young's modulus such that the securing member or loop can be secured to and removed from the shaft with relative ease while still being sufficient to retain the securing member or loop on the shaft in response to a minor perturbation. Exemplary materials include, but are not limited to, silicones, rubbers, elastomers, and thermoplastic elastomers.

Other components of the myofascial release apparatus can be made of or include any material known in the art. For example, the washer can be made of or include a plastic, including any suitable thermoplastic. The head member can be made of or include any number of layers of the same or different material and can include materials that will provide a firm response when compressed by a user. Additionally, or alternatively, the head member can include one or more silicones layered around a thermoplastic core, providing an initial supple touch while retaining rigidity in implementations where a strong compressive force is applied to the head. The shaft can be made of any ferrous metal or ferrous metal alloy in embodiments where the attachment mechanism is a magnet. It should be appreciated that in some embodiments, the materials for each of the components is different. For example, the head (or other components) can be made of metal, wood, stone, or any other desired material to accomplish the disclosed functions and to provide the same or similar benefits.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

In some embodiments, a method for mounting a myofascial release apparatus to a support member of a weightlifting rack includes coupling a head member to a shaft. The head member, for example, can be embodied as a precision nub head, a blunt nub head, and/or a broad nub head, as described herein. In some instances, the head member includes an opening for receiving any combination of a magnet, shim, securing collar, reduction collar, and/or a shaft. In some instances, the magnet, or other attachment mechanism, is integrally formed with the head member (or, alternatively, the shaft or any other member). The shim, securing collar, and/or reduction collar operate, in some implementations, to align the shaft with the head member, and/or to allow the head member to become coupled to shafts of different sizes (e.g., to allow the myofascial release apparatus to be utilizable with support members of weightlifting racks with different sizes of apertures). Accordingly, as needed in a particular embodiment, the step of coupling the head member to the shaft includes inserting a magnet, shim, securing collar, reduction collar, and/or shaft into an opening of the head member to effectuate a removably secure connection between the head member and the shaft.

In other implementations, the head member is integrally formed with the shaft (as described hereinabove with reference to FIGS. 10A-14B), and, therefore, in such embodiments, the above-noted step of coupling a head member to a shaft is omitted.

Another step for mounting a myofascial release apparatus to a support member of a weightlifting rack includes inserting the shaft into one or more apertures of the support member. As noted, the myofascial release is able to accommodate apertures of various sizes (e.g., ½-inch, ¾-inch, ⅝-inch, or 1-inch). In some instances, the shaft extends through two apertures of the support member such that at least a portion of the shaft extends beyond the perimeter of the support member on two sides of the support member (e.g., as shown in FIGS. 3 and 11B). In other instances, the shaft extends through only a single aperture of the support member (e.g., as shown in FIGS. 14A-14B).

In some instances, the head member abuts the support member when the shaft becomes inserted through the one or more apertures of the support member. Accordingly, and optionally, a washer may be used to facilitate secure/stable contact between the head member and the support, and/or to prevent damage that may be caused to the head member by the support beam (e.g., where the head member is constructed of a polymer, and where the support member includes rough metallic edges).

Additionally, mounting a myofascial release apparatus to a support member of a weightlifting rack includes attaching a securing member to the head member and/or the shaft. The securing member is operable, in at least some embodiments, to facilitate a connection between the myofascial release apparatus and the support member that withstands forces applied (e.g., when pressing a body part against the head member from various connections) to the head member by users to maintain the position of the myofascial release apparatus with respect to the support member of the weightlifting rack.

In some implementations, this step includes fitting a toroidally shaped securing member over a shaft that extends beyond the perimeter of the support member (e.g., as shown in FIGS. 5 and 11B). The shaft may include one or more channels/grooves/indents for receiving a toroidally shaped securing member (e.g., as shown in FIG. 11B), or the securing member may be constructed of a material that is able to maintain its position by frictional force along any portion of the shaft (e.g., as shown in FIG. 5). It will be recognized that other shapes/configurations of securing members are within the scope of this disclosure (e.g., a threading securing member, or a securing member implemented as a mechanical clamp).

In other implementations, attaching a securing member to the head member and/or shaft includes fitting a securing loop (e.g., as shown in FIGS. 14A and 14B) around each of a pair of opposing arms extending from a portion of the head member and around the support member of the weightlifting rack.

Abbreviated List of Defined Terms

To assist in understanding the scope and content of the foregoing and forthcoming written description and appended claims, a select few terms are defined directly below.

The terms “approximately,” “about,” and “substantially” as used herein represent an amount or condition close to the stated amount or condition that still performs a desired function or achieves a desired result. For example, the terms “approximately,” “about,” and “substantially” may refer to an amount or condition that deviates by less than 10%, or by less than 5%, or by less than 1%, or by less than 0.1%, or by less than 0.01% from a stated amount or condition.

The term “attachment mechanism” as used herein includes any device in one or more pieces that may be used to “attach” two or more components or to “attach” one component to another component. The term “attach” and/or “attachment” may refer to its common dictionary definition where appropriate, but it may contextually refer to particular acts of connecting, associating, affixing, fastening, sticking, joining, or any combination of the foregoing that cause an object to be fixedly or selectively proximate another object. In some embodiments, the attachment mechanism may be an integral part of a component, whereas in other embodiments, the attachment mechanism may be separate.

An attachment mechanism is to be understood to have any number of movable and/or fixed parts, any of which may be singularly or in combination with one or more components interact to facilitate attachment. As non-limiting examples, an attachment mechanism may include a mechanism for attaching components using one or more—or a combination of—chemical adhesives (e.g., an epoxy and/or other thermosetting adhesives, glue, cement, paste, tape and/or other pressure-sensitive adhesives, etc.), mechanical fasteners (e.g., threaded fasteners such as a combination of a threaded rod together with a complementary threaded nut, rivets, screws, clamps, buckles, tenon and mortise pairs, hook and loop fasteners, dual lock reclosable fasteners, cable ties, rubber bands, etc.), magnets, vacuums (e.g., suction cups, etc.), and/or interference fittings (e.g., press fittings, friction fittings, etc.). Additionally, or alternatively, an attachment mechanism may include any material or element resulting from physically attaching two or more components by crimping, welding, and/or soldering.

It should be appreciated that although a magnet is particularly noted herein as a preferred attachment mechanism between the shaft and head member of disclosed myofascial release apparatuses, any other suitable attachment mechanism (permanent or selective) can be used in addition to or instead of the magnet. For example, an adhesive can be used to adhere the magnet to an inner wall of the head member so that selective interaction of the head member with the shaft his more secure and/or stable.

As used herein, a “blunt nub head” is intended to be understood as the shape or type of head member shown and described in FIGS. 1A-1H, 9, and 12. A “blunt nub head” can have a tapered body, as shown in the corresponding figures, or it can have a cylindrical, angular, or frustoconical body with a substantially similar contact point topology or contact point topology that performs substantially the same function as that shown in the corresponding figures. It should be appreciated, however, that a “blunt nub head” can have any combination of angular, arcuate, or planar surfaces that accomplish substantially the same result as the “blunt nub head” illustrated in the corresponding figures. That is, a “blunt nub head” is intended to impart a force over a larger surface area than, for example, the precision nub head and can in some embodiments be similar to the force applied by the two (or more) joined fingers of a myofascial release therapist (or other similarly blunt object utilized by a myofascial release therapist). Accordingly, a "blunt-nub-headed" apparatus includes those apparatuses having a "blunt nub head" associated therewith.

As used herein, a "broad nub head" is intended to be understood as the shape or type of head member shown and described in FIGS. 9-14B. A "broad nub head" can have a rounded or orb-like body, as shown in the corresponding figures, or it can have one or more contact points that include a substantially rounded are generally arcuate surface. It should be appreciated, however, that a "broad nub head" can have any combination of angular, arcuate, or planar surfaces that accomplish substantially the same result as the "broad nub head" illustrated in the corresponding figures. That is, a "broad nub head" is intended to impart a force over a larger surface area and, for example, the precision nub head and the blunt nub head and can in some embodiments be similar to the force applied by a palm or knee of a myofascial release therapist (or other similarly large-surface-area object utilized by a myofascial release therapist). Accordingly, a "broad-nub-headed" apparatus includes those apparatuses having a "broad nub head" associated therewith.

As used herein, a "precision nub head" is intended to be understood as the shape or type of head member shown and described in FIGS. 9 and 12. A "precision nub head" can have a tapered and/or pointed body, as shown in the corresponding figures, or it can have a cylindrical, angular, or frustoconical body with a substantially similar contact point topology or contact point topology that performs substantially the same function as that shown in the corresponding figures. Thus, it should be appreciated that a "precision nub head" can have any combination of angular, arcuate, or planar surfaces that accomplish substantially the same result as the "precision nub head" illustrated in the corresponding figures. That is, a "precision nub head" is intended to impart a force over a smaller surface area than, for example, the blunt nub head and/or broad nub head and can in some embodiments be similar to the force applied by a finger, elbow, or knuckle of a myofascial release therapist (or other similarly pointed/precision object utilized by a myofascial release therapist). In some instances, the precision nub head can be used to provide focused pressure on a small area of the user's body. The precision nub head, as well as the other had members described herein, is not intended to pierce the skin of user, and the shape of the head member and/or the material comprising the head member is selected and/or designed such that the head member should not pierce a user's skin when used as intended. Accordingly, a "precision-nub-headed" apparatus includes those apparatuses having a "precision nub head" associated therewith.

As used herein, and unless specifically stated otherwise, a "myofascial release apparatus" or "myofascial release device" can be used to implement any one or more of myofascial release therapy, trigger point therapy, or joint mobilization and is therefore synonymous with a "joint mobilization apparatus," a "trigger point therapy device", a "myofascial release and/or trigger point therapy apparatus," a "joint mobilization apparatus and/or myofascial release apparatus," combinations thereof, or similar.

Unless defined otherwise, all technical and scientific terms used herein have the same meaning as commonly understood by one of ordinary skill in the art to which the present disclosure pertains.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," "involves," "contains," etc.), and similar terms as used herein, including within the claims, shall be inclusive and/or open-ended, shall have the same meaning as the word "comprising" and variants thereof (e.g., "comprise" and "comprises"), and do not exclude additional un-recited elements or method steps, illustratively.

It will be noted that, as used in this specification and the appended claims, the singular forms "a," "an" and "the" include plural referents unless the context clearly dictates otherwise. Thus, for example, reference to a singular referent (e.g., "widget") includes one, two, or more referents. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal" and the like are used herein solely to indicate relative directions and are not otherwise intended to limit the scope of the disclosure and/or claimed invention.

To facilitate understanding, like reference numerals (i.e., like numbering of components and/or elements) have been used, where possible, to designate like elements common to the figures. Specifically, in the exemplary embodiments illustrated in the figures, like structures, or structures with like functions, will be provided with similar reference designations, where possible. Specific language will be used herein to describe the exemplary embodiments. Nevertheless, it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Any headings used herein are for organizational purposes only and are not meant to be used to limit the scope of the description or the claims.

Various aspects of the present disclosure can be illustrated by describing components that are bound, coupled, attached, connected, and/or joined together. As used herein, the terms "bound," "coupled", "attached", "connected," and/or "joined" are used to indicate either a direct association between two components or, where appropriate, an indirect association with one another through intervening or intermediate components. In contrast, when a component is referred to as being "directly bound," "directly coupled", "directly attached", "directly connected," and/or "directly joined" to another component, no intervening elements are present or contemplated. Furthermore, binding, coupling, attaching, connecting, and/or joining can comprise mechanical and/or chemical association.

Conclusion

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A myofascial release device kit for attaching to a support member of a weightlifting rack, the myofascial release device kit comprising:

a solitary head member defining a recess;

an unthreaded shaft configured to be secured within the recess of the solitary head member and configured to be removably secured within the support member of the weightlifting rack, a first terminal end disposed at a first distal end of the head member;

a second terminal end disposed at a second distal end of the shaft; and a toroidal securing member sized to fit around and releasably secure to the shaft, wherein the myofascial release device kit is radially symmetric along a central axis extending from the first terminal end to the second terminal end.

2. The myofascial release device kit as in claim 1, wherein the solitary head member further comprises a magnet for removably securing the solitary head member to the shaft, the magnet being positioned within the recess of the solitary head member.

3. The myofascial release device kit as in claim 1, further comprising: a washer that is sized and shaped to fit around the shaft and configured to be flush with a second distal end of the solitary head member.

4. The myofascial release device kit as in claim 1, comprising one or more collars sized and shaped to fit within the head member and configured to align the head member with the shaft.

5. The myofascial release device kit as in claim 1, wherein the shaft is cylindrical in shape, and wherein no portion of the shaft comprises a larger diameter than a first distal end of the shaft.

6. The myofascial release device kit as in claim 1, wherein the head member comprises a blunt nub head, a precision nub head, or a broad nub head.

7. The myofascial release device kit as in claim 1, further comprising one or more additional interchangeable head members.

8. The myofascial release device kit as in claim 1, further comprising a handle operable to removably secure within the opening of the head member and to enable manual manipulation of the head member.

9. The myofascial release device kit as in claim 1, wherein a first side of the securing member is configured to abut a back side of the support member opposite the solitary head member and a second side of the securing member is not in contact with another surface when the securing member is releasably secured to the shaft, such that an uncovered portion of the shaft comprising the second distal end of the shaft extends past the securing member.

10. A myofascial release system, comprising:

a weightlifting rack; and a myofascial release device comprising:

a solitary head member defining a recess;

an unthreaded shaft (i) configured to be secured within the recess of the head member and (ii) configured to releasably secure to the weightlifting rack;

a first terminal end disposed at a first distal end of the solitary head member;

a second terminal end disposed at a second distal end of the shaft; and a toroidal securing member sized to fit around and releasably secure to the shaft, wherein the myofascial release device kit is radially symmetric along a central axis extending from the first terminal end to the second terminal end.

11. The myofascial release system of claim 10, wherein, when the myofascial release device is anchored to the weightlifting rack, the shaft passes through one or more apertures of a support member of the weightlifting rack such that the solitary head member is proximal to a first side of the support member and an uncovered end portion of the shaft comprising the second distal end of the shaft extends beyond a second side of the support member opposite to the first side.

12. The myofascial release system of claim 10, wherein the shaft is removably connected to the solitary head member.

13. The myofascial release system of claim 10, wherein the head member comprises a pair of opposing arms extending away from a base of the head member.

14. A method for mounting a myofascial release apparatus to a support member of a weightlifting rack, comprising:

inserting an unthreaded shaft of the myofascial release apparatus through one or more apertures of the support member, the shaft being secured within a recess of a solitary head member of the myofascial release apparatus, such that the shaft extends beyond a perimeter of the support member;

wherein the myofascial release apparatus comprises a first terminal end disposed at a first distal end of the solitary head member and a second terminal end disposed at a second distal end of the shaft such that the myofascial release device kit is radially symmetric along a central axis extending from the first terminal end to the second terminal end; and fitting a toroidal securing member around the shaft such that the toroidal securing member abuts at least a portion of the support member, wherein the toroidal securing member becomes removably secured to the shaft.

* * * * *